Sept. 21, 1937.  P. L. SMITH  2,093,688
MILK BOTTLE HOLDER OR RECEPTACLE
Filed Jan. 21, 1936  2 Sheets-Sheet 1
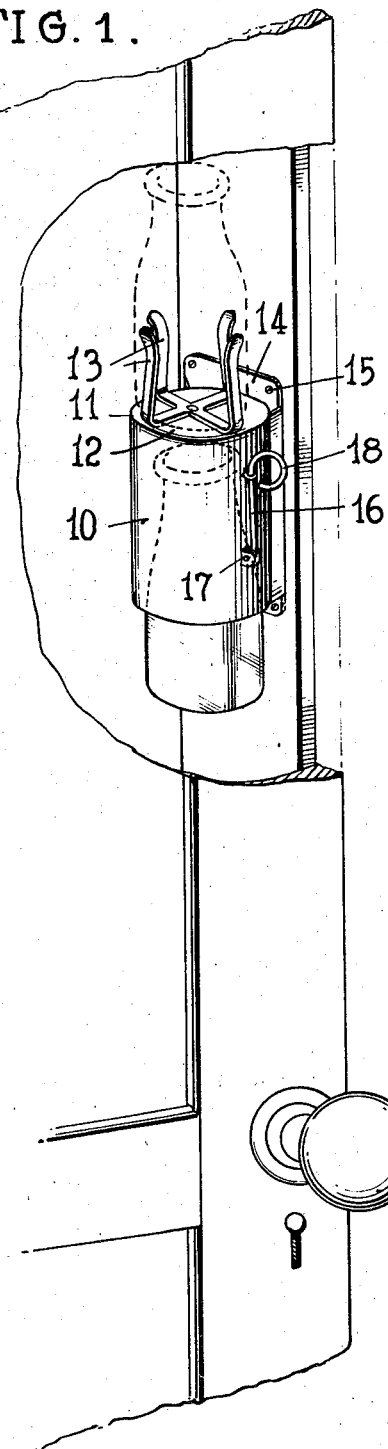
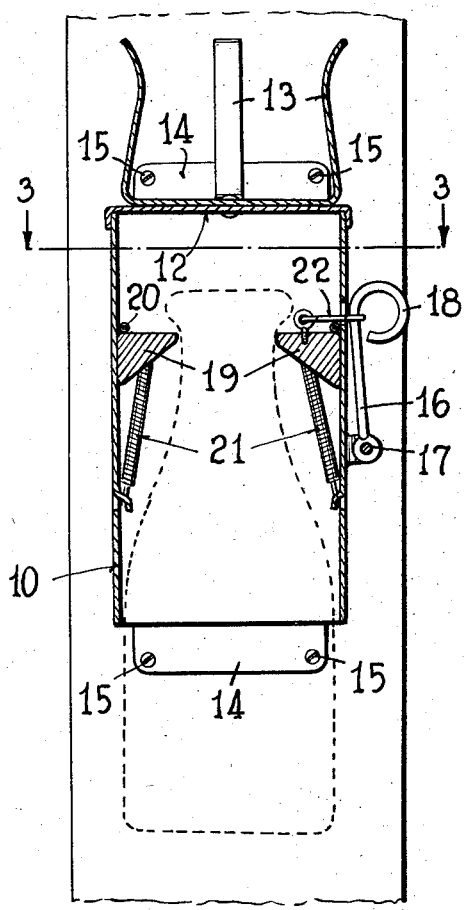
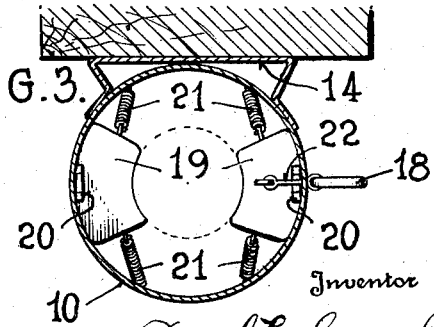

Sept. 21, 1937.                P. L. SMITH                2,093,688
                    MILK BOTTLE HOLDER OR RECEPTACLE
                       Filed Jan. 21, 1936        2 Sheets-Sheet 2
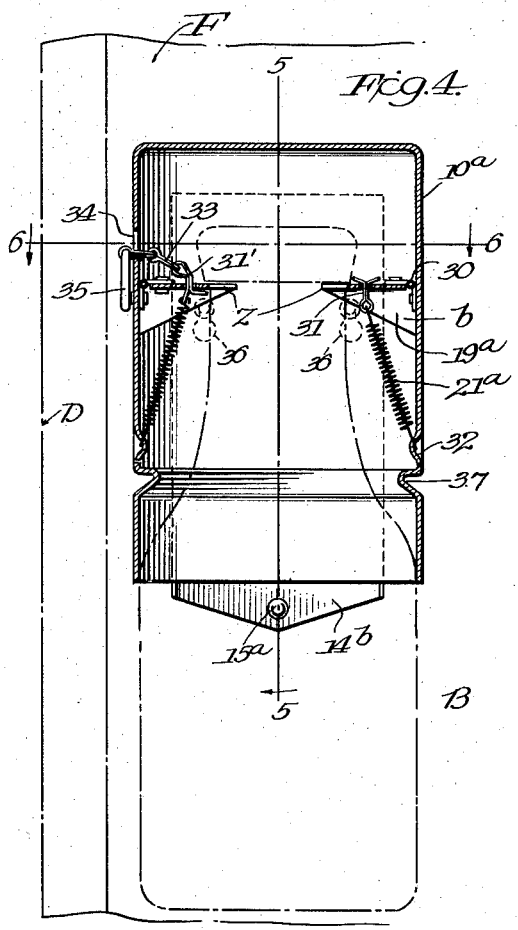
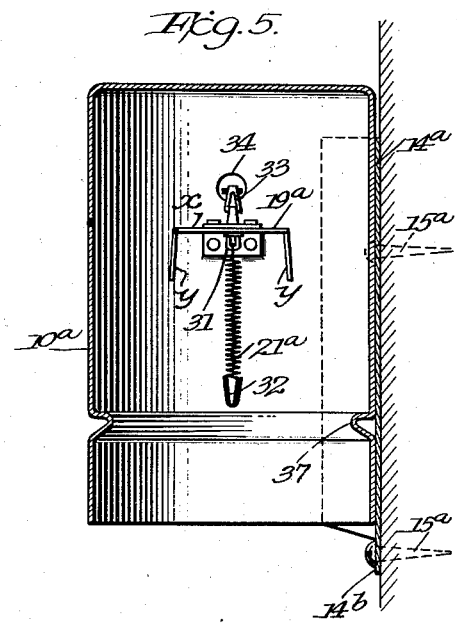
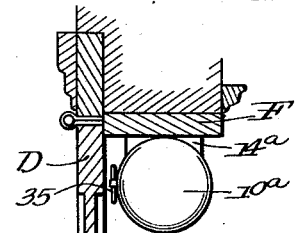
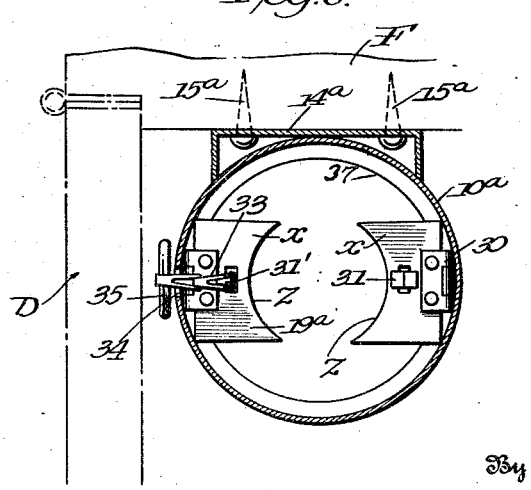
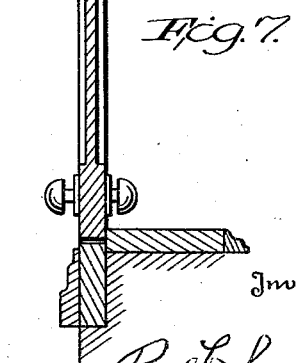

Patented Sept. 21, 1937

2,093,688

UNITED STATES PATENT OFFICE 2,093,688

MILK BOTTLE HOLDER OR RECEPTACLE

Paul L. Smith, New Castle, Del.

Application January 21, 1936, Serial No. 60,125

3 Claims. (Cl. 232—42)

My invention relates to holders or receptacles for bottles of milk or cream into which the same may be placed by the milkman at the doors of customers on the outside thereof, an object of my invention being to safeguard the same when delivered, against theft, and requiring the minimum of time of the milkman in depositing a bottle in the holder or receptacle, and enabling the easy and quick removal by the customer.

In the drawings, I illustrate very satisfactory embodiments of my invention, but it is to be understood that my invention consists in whatever is described by or is included within the terms or scope of the appended claims.

Fig. 1 is a perspective view of an embodiment of my invention shown applied to the jamb of a door;

Fig. 2 is a vertical section thereof;

Fig. 3 is a horizontal section on the line 3—3 of Fig. 2;

Fig. 4 is a vertical section of an embodiment of the invention of slightly different construction;

Fig. 5 is a vertical sectional view taken substantially on line 5—5 of Figure 4;

Fig. 6 is a transverse sectional view taken substantially on line 6—6 of Figure 4, and Fig. 7 is a transverse sectional view taken through a door and its frame, and showing the bottle holder of the invention in another position of use than shown in Figure 1.

To suit the greatest convenience of the customer and facilitate delivery and economize time of the milkman, I locate or place my holder or receptacle adjacent an outer door of the dwelling or apartment of the customer, and I have so contrived the holder or receptacle as to utilize the door as the means for preventing removal of the milk bottle unless the door is opened, (see Figures 1, 6 and 7). Thus in a most simple and efficient manner the filled milk bottle is safeguarded from theft. In order to enable the filled milk bottle to be taken from the holder the door must first be swung open, and yet with the door closed and latched, the milkman, by what in effect is an automatic action, can by a simple thrusting action place the filled milk bottle in the holder and automatically latch it therein so that removal is impossible without first opening the door.

It is a desirable feature of my invention that the milk bottle is placed in the holder through an opening at the bottom therein and removed by a downward movement, since this enables the complete covering or closure of the top of the holder so that the top of the milk bottle is protected from access thereto of rain or snow and cats and, at the same time, the holder itself is protected against the entrance thereto of dust or dirt or elements from the top, thus rendering the top available as a holder for an empty milk bottle to be collected by the milkman on his delivery of the filled bottles.

As in accordance with my invention, only the upper portion of the milk bottle needs to be housed or enclosed within the holder, the latter need not have dimensions completely enclosing the lower portion of the milk bottle. This, besides saving material, has the advantage that the lower portion of the milk bottle is exposed when it is in the holder or receptacle and it may be seen at a glance whether the milkman has delivered the bottle of milk.

Describing in detail what is shown in the accompanying drawings, it will be seen that I provide as the main or body part of the holder embodying my invention a cylindrical shell 10 of sheet metal whose internal diameter may be slightly less than or the same as the external diameter of the milk bottle so that the latter may pass vertically freely into the shell and be withdrawn therefrom. From top to bottom the shell 10 is something about half the height of the milk bottle so that when the milk bottle is in latched position within the shell substantially the lower enlarged half thereof will be exposed to view.

The shell 10 is closed at the top by a flat cap or cover 11 to which are attached several upwardly extending spring arms 12 between which may be thrust the lower portion of an empty milk bottle and the same thereby held securely in position, although readily removed by the milkman.

At one side of the cylindrical shell is means by which it may be cheaply, yet securely, fastened in the face of the door jamb 13, such means conveniently consisting of a flat sheet metal plate 14 to which there is a rigid connection of the shell and which at several parts has holes for fastening screws 15.

The receptacle or holder is, of course, fastened to the door frame side, outside the closed door so that it is at once accessible to the milkman in his delivery and so that anyone opening the door without stepping outside, may reach and remove the filled milk bottle and place an empty bottle on top of the holder.

Within the upper part of the shell 10 is a bottle engaging latch device, (19 in Figures 2 and 3, and 19a in Figures 4 to 7), which catches under the flange provided at the top of all milk bottles at the mouth thereof, and thereby the bottle is suspended within the shell and may only be removed by the disengagement therefrom of the latch device. Such latch device is of description which automatically interlocks with the bottle flange when the filled bottle is thrust up into the shell the proper distance by the milkman.

Contact of the top of the milk bottle with the under side of the cover 11 will apprise the milkman if he has thrust the filled milk bottle far enough upward into the shell to latch it therein.

Release of the milk bottle requires withdrawal of the latch device from beneath the flange at the top of the bottle. This is accomplished in form shown in Figures 2 and 3, by connecting to the latch device a finger-operative lever 16 pivoted in a vertical position at its lower end to ears 17 on the outside of the shell 10 and which at its upper end has a finger engageable ring 18 by which it may be pulled outward to release the latch. Said lever 16 is positioned on the shell, so that, when the door is closed, it will be covered by the door and the side of the door will contact with the ring 18 thus making it impossible, with the door in a closed position, for the lever 16 to be operated to release the bottle latch 19.

The latch device, shown in Figures 2 and 3 of the drawing, consists of two diametrically opposite duplicate fingers 19, each pivoted by a pivot 20 at its outer edge to the inner side wall of the shell 10 and adapted to swing on its pivot upward against the pull of tension spring 21 when the upper end of the milk bottle is thrust upward against the inner beveled under side of said fingers, and, when the bottle flange passes above such fingers, to swing inward into contact with the adjacent sides of the bottle neck below the flange and thus affording a sure suspension support for the filled milk bottle. The distance between the distal edges of the opposite latch fingers 19, is substantially the same as the external diameter of the bottle neck below the flange. It is sufficient for the purpose of freeing the bottle from the latch device to swing away from beneath the mouth flange only one of the latch fingers and, accordingly, the finger near the finger lever 16 is connected by a chain or link device 22 to the lever 16 adjacent the upper end thereof so that by pulling outward upon said lever said latch finger may be withdrawn sufficiently from the side of the bottle neck as to permit the bottle to be moved downward out of the shell.

It will be observed that not until the finger lever is pulled outward to release the bottle may the latter pass downward out of the shell and this secures against the accidental dropping of the bottle out of the shell, which might happen should the release of the latch 19 take place automatically on swinging the door open. Thus, one desiring to release a filled bottle, may place his hand below the filled bottle or grasp the lower part of the shell 10 before disengaging the latch with the other hand.

In order to afford a substantial bearing for the bottle flange, each latch finger is a segment of substantial arc and at each end, preferably, is attached a coiled spring whose lower end is attached to the interior of the shell 10 so that it normally tends to pull the latch to bottle engaging position.

In the forms of the invention shown in Figures 4 to 7 inclusive, the construction of certain detailed parts of the bottle holder has been changed. However, like parts of this form of the invention will be indicated with the same numerals as the parts of the embodiment shown in Figures 1 to 3 inclusive, except that they will be raised by the exponent a.

The principal difference in this form of the invention over those previously described, resides in the latch members 19a being constructed of sheet metal pieces x each having downwardly turned end portions y, which form stops or rests abutting the inner side walls of the shell 10a in their normal position as shown. The portions x of the latch finger members 19a are preferably of considerable area, as shown, and are fastened to the shell 10a by hinges which may be riveted or otherwise fastened to the fingers and to the shell 10a. The opposing distal edges z of the latch fingers 19a are curved to fit the contour of the bottle neck which they are to engage. The bottom edges of stops y taper upwardly toward the distal edge of fingers.

One end of a spring 21a is connected to each finger by an eyelet 31 and 31' respectively, and the other ends to lugs 32 struck from the sidewalls of the shell 10a.

In this form of the invention instead of the latch 19a being operated by a pivoted lever 16, as in Figures 1–3, it is operated by a chain or other irregular surfaced flexible member 33 connected with the eyelet 31' and extending through an opening 34 formed in the sidewall of shell 10a. The chain 33 has on its outer end a ring 35 which normally depends therefrom. The chain 33 is, preferably, of such length that in the normal position of the latch 19a, to which it is connected, the ring lies adjacent the opening 34, as shown.

Thus, it will be seen that when the bottle holder is secured to a door frame F with the ring in juxtarelation to the closed door D, or the closure, the ring is not accessible and, should an attempt be made to pull the ring down with a hook or other instrument, it can not be accomplished, because the chain 33 would not pass around the lower edge of the opening 34, it being necessary for the door D to be opened and the ring 35 pulled in a direction substantially in the same plane of the axis of the opening 34.

Furthermore in this embodiment of the invention the shell is provided with annular inwardly extending baffle 37, preferably, but not necessarily, formed by depressing the side wall of the shell 10a inwardly at a point somewhat removed from the lower opened end of the shell. This baffle extends inwardly a sufficient distance to prevent the insertion of an instrument up through the bottom opening of the shell, when the bottle is in place, for the purpose of raising one or more of the retaining fingers of latch 19a, so as to enable an unauthorized removal of the bottle from the holder.

In this form of the invention the fastening screws 15a are positioned on the anchor plate 14a, so as to be obscured and inaccessible to tampering, particularly when the bottle is in position in the holder. To this end the anchor plate is formed with two slots 36, in its area opposite the shell 10a, each of these slots having an enlarged lower end portion through which a head of a screw 15a may pass, and the upper end of the slot 36 is of a dimension smaller than the dimension of the head of the screw so that the screw may not pass therethrough. The anchor plate 14a is further provided with a portion 14b, which projects slightly below the lower end of shell 10a, and has a centrally disposed opening therein through which a screw 15a passes, the head of which being larger than the dimension of the last said opening. This opening in the extension 14b, and its screw 15a, are so positioned as to be obscured and inaccessible by the bottle B, when it has been inserted in position in the holder.

While I consider the embodiments of my invention shown in the drawings and which I have described in detail as most excellent embodiments of my invention, it is to be understood that I do not confine the scope of my protection to those embodiments thereof, except as required by the claim expression. Should it be desired to use an embodiment of my invention in a position where a closure D, such as a door or window, is not available to prevent surreptitious action of the latch releasing lever, a padlock might be employed, which could be applied to the rings 18 or 35, and to an adjacent stationary ring or staple, but no such lock device is required when a door or other closure at the point of delivery of the filled bottle is available.

What I claim is:

1. A holder for bottles comprising a shell closed at its sides and top and opened at its bottom, whereby a bottle may be thrust into the shell from the bottom of the latter upwardly therein, bottle engaging latch device situated within the upper part of the shell and comprising at least one pivoted finger mounted on the shell and normally urged to a position transverse of the shell and adapted to engage under the lip of the bottle to retain the bottle in position, a flexible irregular surfaced member presenting projections and connected to said latch finger and extending through an opening in the side wall of the shell and having its outer extremity normally lying against the outer surface of the shell and depending from said opening, said opening being positioned in the shell to lie adjacent and opposite the door or closure and to be covered and rendered inaccessible by the door when the latter is closed whereby any pull on the flexible member when the door is closed will be prevented by the projections on the connecting member engaging the inner edge of the opening.

2. A device as set forth in claim 1, further characterized by a ring attached to the outer end of said flexible connecting member, and said flexible connecting member being of a length to retain the ring adjacent the opening through which said connecting member extends, when the latch finger is in its normal latch position.

3. A holder for bottles comprising a shell closed at its top and opened at its bottom, whereby a bottle may be thrust into the shell from the bottom thereof upwardly therein, latch means situated within the upper part of the shell to engage and slip under the lip of the bottle upon its inserting thrust into the shell to retain the bottle in position therein, the shell being of a length between its closed and open ends to permit the major diameter of the bottle to enter the shell upon the upward thrust thereinto and, when the bottle is in position on the latching means, the lower portion of the shell lying opposite and in close relation to the major diameter of the bottle, and means for permitting the removal of the bottle from engagement from said latch means and said shell, means permitting the attachment of said shell in supported position, a baffle extending inwardly from the walls of the shell substantially midway between said latch means and its opened bottom end so as to permit said relative sliding movement between the bottle and shell and providing an opening of less diameter than the major diameter of the bottle, whereby insertion of instruments into the bottom of the shell when the bottle is in position will be deflected to prevent tampering with the latch means.

PAUL L. SMITH.